Nov. 12, 1968  R. A. HARRIS ETAL  3,410,466
APPARATUS AND METHODS FOR ADVANCING AND POSITIONING
SHEET MATERIAL
Filed June 14, 1966  7 Sheets-Sheet 1

INVENTORS
R. A. HARRIS
H. V. STANFIELD

BY *S. Gundersen*

ATTORNEY

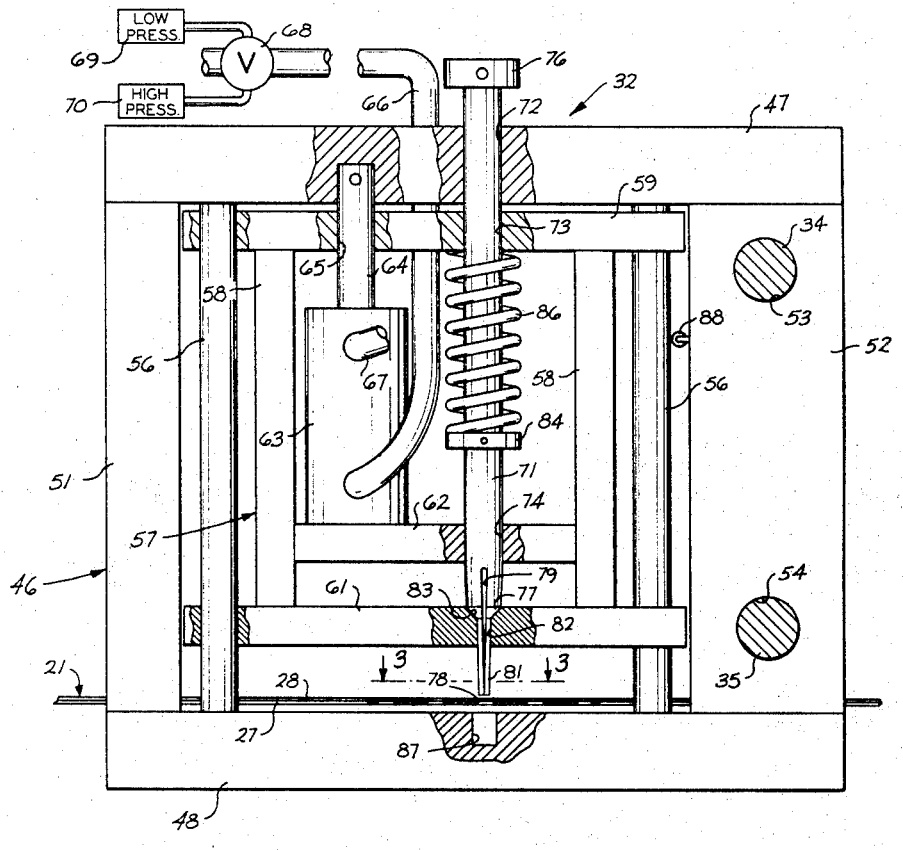

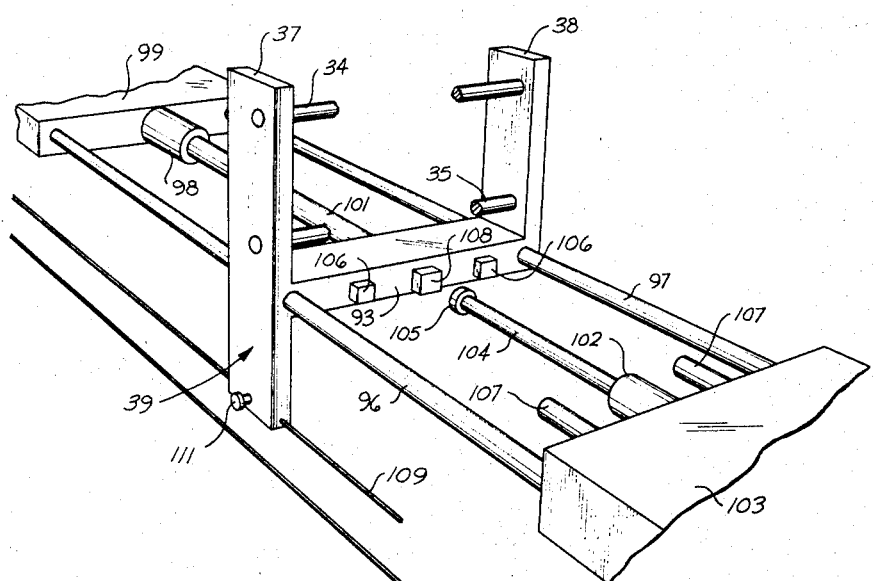
FIG. 7
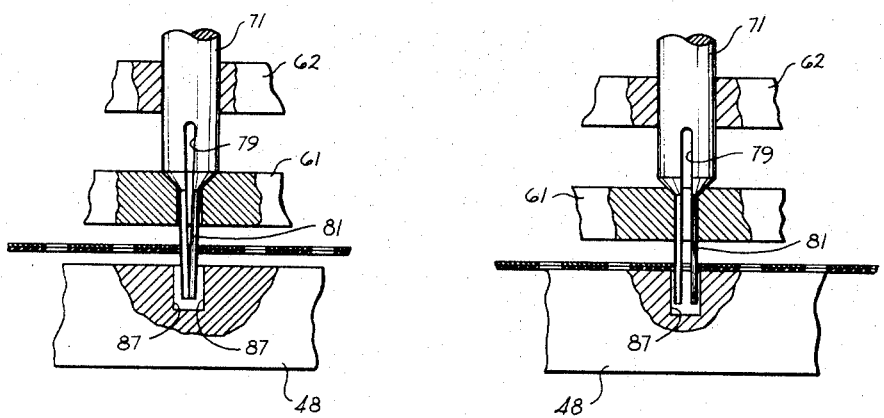
FIG. 5
FIG. 6

Nov. 12, 1968  R. A. HARRIS ETAL  3,410,466
APPARATUS AND METHODS FOR ADVANCING AND POSITIONING
SHEET MATERIAL
Filed June 14, 1966

United States Patent Office 3,410,466
Patented Nov. 12, 1968

3,410,466
APPARATUS AND METHODS FOR ADVANCING
AND POSITIONING SHEET MATERIAL
Richard A. Harris, High Point, and Henry V. Stanfield,
Greensboro, N.C., assignors to Western Electric Company, Incorporated, New York, N.Y., a corporation of
New York
Filed June 14, 1966, Ser. No. 557,501
10 Claims. (Cl. 226—6)

ABSTRACT OF THE DISCLOSURE

Apparatus and methods for advancing and positioning sheet material having guide holes therein which include moving an expandable member into a guide hole, providing slack in the sheet material, expanding the member to grip the sheet material, and advancing the gripped and slackened sheet material to a fabricating station. After advancement, the remaining slack is removed so that a fabricating operation can be accurately performated on the advanced material.

This invention relates to apparatus and methods for advancing sheet material and particularly to apparatus and methods for advancing sheet material having guide holes therein to a fabricating station, and for positioning a portion of the sheet material in accurate registration with one of the guide holes. In particular, the apparatus and method are especially adapted to accuartely advance and position flexible sheet material used in the manufacture of printed circuits so that electrical circuit patterns may be accurately printed on the material in registration with the guide holes.

In the manufacture of printed circuits, circuit patterns are generally printed or formed by various well-known processes such as, for example, silk screening or photographic processes, on a composite or laminate material consisting of a metallic layer bonded to or deposited on a thermoplastic layer. One common type of printed circuit sheet material is a flexible copper-Mylar laminate. After the circuit pattern is printed on the sheet maerial, various steps are carried out, such as etching and rinsing, to produce the desired circuit configuration in the copper. Subsequently, other fabricating operations are performed, including punching holes through the printed circuit configuration to provide openings through which electrical component leads or the like can be attached, and blanking the finished printed circuit from the sheet material.

Guide holes are evenly spaced along the sides of the sheet material to facilitate the feeding of the material through the various fabricating stations. These guide holes are used to locate and position the sheet material with respect to fabricating tools such as printing heads, punches, dies, drills, and the like located at the various fabricating stations. Consequently, it is of utmost importance that the printed circuit pattern, when first applied to the sheet material, be located accurately in registration with the guide holes to insure that subsequent fabricating operations may also be performed accurately.

It is well known that printed circuit material of the type described above is dimensionally unstable, particularly in view of the fact that the coefficients of thermal expansion of the metallic layer and the thermoplastic layer vary greatly from one another. Consequently, changes in temperature, humidity, and the like may cause undesirable dimensional changes in the sheet material. If circuit patterns were printed on the sheet material without considering or accounting for the dimensional changes which may occur, it is evident that some circuit patterns would not be in accurate registration with the guide holes and that therefore subsequent fabricating operations could not be accurately performed.

In addition, the thickness of the printed circuit sheet material is generally very small, for example, being in the range of .005–.0010, and great care must be taken in advancing the material to prevent any deformation of the guide holes which would contribute to incorrect registration of a circuit pattern with subsequent fabricating tools.

Accordingly, it is an object of this invention to provide new and improved sheet material advancing apparatus.

It is another object of this invention to provide new and improved methods for advancing sheet material.

It is a further object of this invention to provide apparatus for advancing sheet material having facilities which moves into guide holes in the sheet material to position and advance the material without deforming the guide holes.

It is a further object of this invention to provide apparatus for advancing sheet material, for producing slack in the sheet material prior to advancement thereof of eliminate any tensile forces thereon, and for making the sheet material taut subsequent to advancement to provide accuracy in a fabricating operation.

Another object of this invention resides in a method for producing slack in the sheet material, then advancing the sheet material, and removing the slack prior to performing a fabricating operation.

A further object of this invention resides in a method for advancing easily deformable sheet material by inserting a constricted member in a guide hole of the sheet material, slackening the sheet material, expanding the constricted member within the guide hole to grip the material without deformation thereof, and advancing the sheet material to a fabricating station.

With these and other objects in view, the present invention contemplates an apparatus for advancing sheet material having guide holes therein to a fabricating station. The apparatus has collet facilities which are movable into guide holes in the sheet material. Other facilities are actuated by the movement of the collet facilities into the guide holes to produce slack in the sheet material and to subsequently cause the collet facilities to expand within the guide holes to position and grip the sheet material so that advancement of the collet facilities advances the sheet material to the fabricating station. Other facilities are actuated by the advancement of the sheet material to remove any remaining slack in the material in preparation for the fabricating operation.

Furthermore, the present invention contemplates methods for advancing sheet material having guide holes in it wherein the sheet material is gripped from within the guide holes and the sheet material is slackened. Then the sheet material is advanced to a fabricating station and the remaining slack is removed so that a fabricating operation can be accurately performed.

Other objects and advantages of the present invention will be apparent from the following detailed description when considered in conjunction with the accompanying drawings, wherein:

FIG. 2 is a partially sectioned view taken along line 2—2 of FIG. 1 showing a collet assembly;

FIG. 3 is a view taken along line 3—3 of FIG. 2 showing in cross section the constricted collet fingers of the right collet assembly and their relationship with the guide holes along the right edge of the sheet material;

FIG. 4 is a view similar to FIG. 3 showing in cross section the constricted collet fingers of the left collet assembly and their relationship with the guide holes along the left edge of the sheet material;

FIG. 5 is a partial enlarged view of the collet assembly in FIG. 2 showing the constricted fingers of the collet after being moved into a guide hole in the sheet material;

FIG. 6 is a partial enlarged view of the collet assembly in FIG. 2 showing the collet seat disengaged from the collet fingers permitting the fingers to expand within the guide hole of the sheet material;

FIG. 7 is a perspective view of the traversing assembly which advances the collet assemblies;

Figure 1:
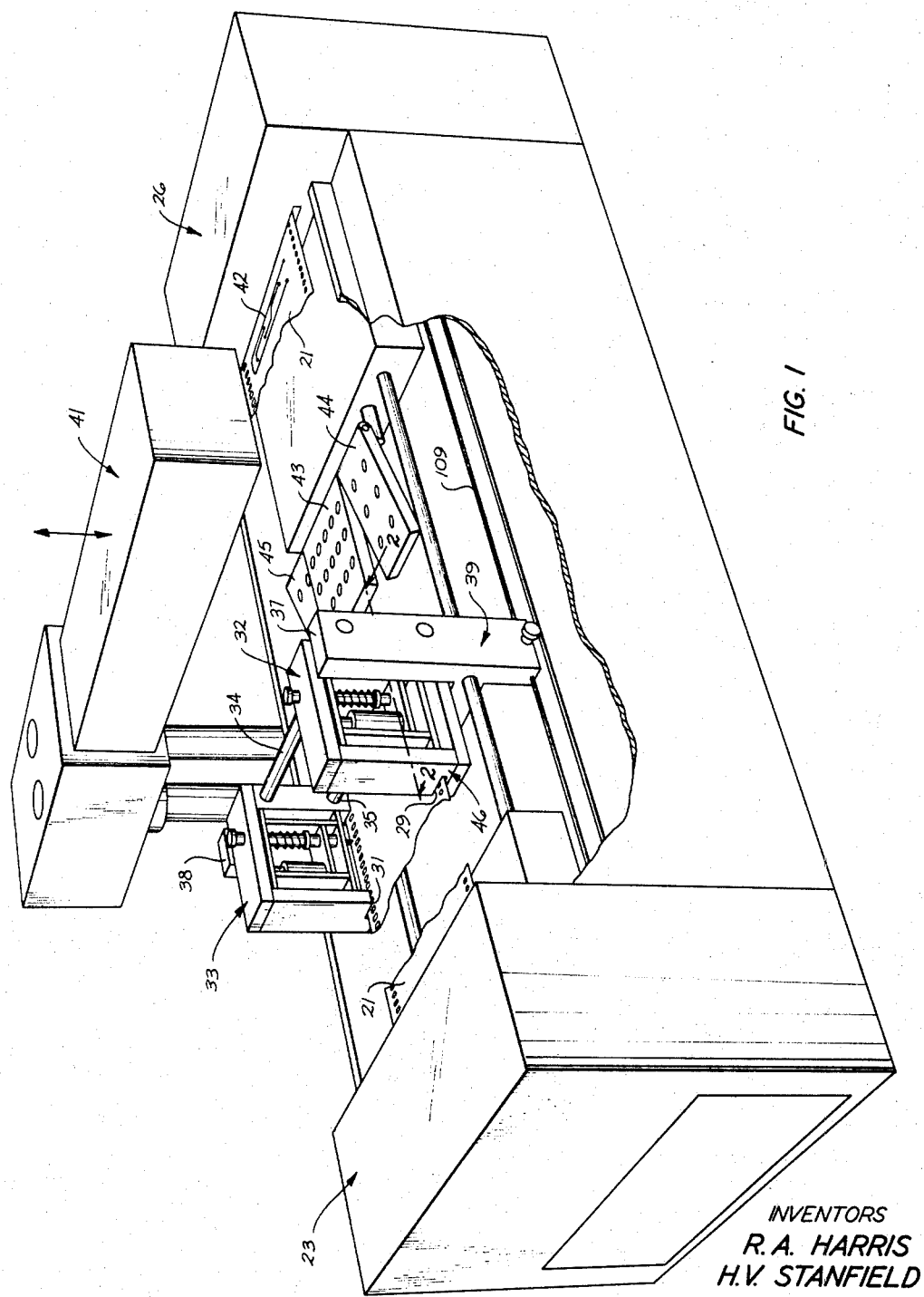
FIG. 1 is a perspective view of a machine for advancing and positioning sheet material so that electrical circuit patterns can be printed thereon.

Referring now to FIG. 1, there is shown a machine for advancing sheet material 21 from a supply roll 22 (shown in FIG. 8) which is located at the supply station generally designated as 23 to take-up roll 24 (shown in FIG. 9) which is located within the take-up station generally designated as 26. The sheet material 21 is a composite material consisting of a thermoplastic layer 27, such as Mylar, which has bonded thereto or deposited thereon a copper layer 28, as shown in FIG. 2.

The sheet material 21 is guided within slots 29 and 31 of a right collet assembly generally designated as 32, and a left collet assembly generally designated as 33. The collet assemblies 32 and 33 are slidably mounted on a pair of guide rods 34 and 35 which are supported by two upright standards 37 and 38 which are part of a traverse assembly generally designated as 39. The collet assemblies 32 and 33 can be adjusted along the guide rods 34 and 35 to accommodate different widths of sheet material 21. The traverse assembly 39 is movable longitudinally along the machine by facilities to be described more fully hereinafter.

The traverse assembly 39 and collet assemblies 32 and 33 advance the sheet material 21 along the machine so that a printer generally designated as 41 can print an electrical circuit pattern 42 on the sheet material. A stationary vacuum table 43 is located at the printing station beneath the sheet material 21 and vacuum is applied thereto after the sheet material 21 is advanced to hold the sheet material 21 flat thereagainst during the printing operation. In addition, a pair of pivotally mounted vacuum tables 44 and 45 are positioned on either side of the stationary vacuum table 43 and are movable to form a flat surface even with the table 43 after the sheet material 21 has been advanced and the collet assemblies 32 and 33 have been retracted. Vacuum tables 44 and 45 are normally held in their downward position so as not to impede the forward movement of the collet assemblies 32 and 33 during advancement of the sheet material 21. The vacuum tables 43, 44, and 45 together, are as wide as, or wider than, the width of the sheet material 21 in order to hold the entire width of the sheet material 21 flat and secured thereagainst during the printing operation.

Referring now to FIG. 2, collet assembly 32 includes a frame which has a top plate 47, a bottom plate 48, and two side plates 51 and 52. Side plate 52 has apertures 53 and 54 therethrough for receiving the guide rods 34 and 35 by which the collet assemblies 32 and 33 are mounted to the traverse assembly 39. A pair of vertical guide rods 56 are fixed to and supported by the top and bottom plates 47 and 48 of the frame 46.

A cage, generally designated as 57, is mounted for movement on the guide rods 56 within the frame 46. Cage 57 consists of a pair of side plates 58 which are fixed to a top plate 59 and a bottom plate 61. An intermediate plate 62 is mounted between the side plates 58 and supports an air or hydraulic cylinder 63 which has its lower end fixed to the plate 62.

The air cylinder 63 has a piston rod 64 extending upwardly through an aperture 65 in the top plate 59 with the upper end thereof fixed to the top plate 47 of the frame 46. Cylinder 63 has a supply line 66 and exhaust line 67 connected thereto. A valve 68 is mounted in the supply line 66 for selectively introducing a low pressure source 69 or a high pressure source 70 into the cylinder 63 in response to certain sequences occurring during a cycle of operation.

A collet 71 is mounted for movement through apertures 72, 73, and 74, in top plates 47, top plate 59, and intermediate plate 74, respectively, A stop member 76 is fixed to the upper end of the collet 71 to limit the vertical movement of the collet 71 with respect to the frame 46. The other end of the collet is tapered at 77 down to a diameter substantially equal to the diameter of guide holes 78, which are evenly spaced along the right edge of the sheet material 21.

A plurality of slots 79 are formed or cut in the lower end of the collet 71 to provide a plurality of resilient fingers 81. Because of the slots 79, the fingers 81 are capable of being constricted to a diameter which is smaller than the diameter of the guide holes 78. In order to provide for resiliency in the fingers 81, the collect 71 is either constructed out of a material having natural resilient characteristics or a material which is capable of being treated to have spring-like qualities. In addition, separate resilient fingers could be mounted to a lower end of a collet of some other material to serve the same purpose. While two slots 79 are shown (FIG. 3) cut in the end of the collet 71 to divide the end thereof into four segmented fingers 81, it is clear that more or less slots could be utilized to provide either two or more resilient fingers.

To constrict the fingers 81, the bottom plate 61 of the cage 57 has a bore 82 therethrough and a counterbore 83, hereinafter referred to as the collet seat, for receiving the fingers 81 and taper 77 of the collet 71. A collar 84 is fixed to the collet 71 above the intermediate plate 62 and supports a spring 86 which is mounted coaxially about the collet 71 between the collar 84 and the top plate 59 of the cage 57. The spring 86 urges the collet 71 downwardly with sufficient force to maintain the taper 77 within the collet seat 83 so that the fingers 81 are normally constricted.

When the air cylinder 63 is connected to the low pressure source 69, the cage 57 moves downwardly until the stop member 76 of collet 71 abuts against the top plate 47 of the frame 46. The low pressure source 69, however, is not capable of compressing spring 86 and hence cannot move the cage 57 past the position where stop member 76 engages plate 47. The high pressure source 70, on the other hand, provides sufficient force to move the cage 57 downwardly against the force of spring 86. Such further downward movement moves the collet seat 83 away from the taper 77 of collet 71, thus permitting the constricted fingers 81 to expand.

In the operation of the collet assembly, the sheet material 21 is held taut and valve 68 is connected to the low pressure source 69 to actuate the air cylinder 63 to move the cage 57 downwardly so that the constricted fingers 81 of collet 71 pass through the guide hole 78 as shown in FIG. 5 and enters a bore 87 in the bottom plate 48. Movement of cage 57 ceases when the stop member 76 abuts against the top plate 47. At this point, mechanisms which introduce slack into the sheet material 21 are actuated by switch 88, mounted on side plate 52 of frame 46, which is closed by the downward movement of the top plate 59.

After slack has been introduced into the sheet material, the valve 68 is actuated to connect the high pressure source 70 to cylinder 63 which causes the cage 57, including the collet seat 83, to move downwardly relative to the collet 71 which is held by the stop member 76. This moves the collet seat 83 away from the taper 77, thus permitting the constricted fingers 81 to expand within the guide hole 78 of the slackened material 21.

It is to be noted that the expansion of the collet fingers 81 does not occur until after the fingers have been inserted into the guide holes 78 and all downward motion thereof is completed. This eliminates any tendency of the fingers 81 to curl or deform the periphery of the guide holes 78 as it enters the hole. As pointed out previously, deformed guide holes make registration difficut in subsequent fabricating operations. It is to be further noted that the slack introduced into the sheet material 21 eliminates any tensile forces and permits the fingers 81 to expand within the guide hole 78 and to shift the sheet material 21 easily without causing any deformation of the guide holes 78. The diameter of bore 87 is, of course, sufficient to permit full expansion of the fingers 81 when the collet seat 83 is moved away from the taper 77.

The left collet assembly 33 is similar to the previously described collet assembly 32 with the exception that the lower end of its collet 89 has an oval cross section as shown in FIG. 4. Furthermore, collet 89 has only one slot 90 cut therein to form two resilient fingers 91 which fit within oval guide holes 92 located on the left edge of the sheet material 21. Note that the width W of the collet 89 is less than the width X of the guide hole 92. This dimensional difference takes into consideration any dimensional changes occurring across the width of the sheet material 21 due to the dimensional instability of the material. For example, if two collets of circular cross-section were utilized, it is possible that the dimensional changes between a pair of corresponding guide holes 78 and 92, on either edge of the sheet material 21, might cause either buckling or stretching of the sheet material when the collet fingers were expanded, depending upon whether the dimensional change increased or decreased the width of the sheet material 21. Aside from the aforementioned differences, collet assembly 33 operates and functions similar to the previously described collet assembly 32.

Longitudinal movement is imparted to the collect assemblies 32 and 33 by the traverse assembly 39 and associated apparatus which is shown in detail in FIG. 7. The traverse assembly 39 includes a pair of upright standards 37 and 38 which have guide rods 34 and 35 mounted therebetween to support the collet assemblies 32 and 33. A cross member 93 connects the standards 37 and 38. The traverse assembly 39 is supported for longitudinal movement along guide rods 96 and 97. An air or hydraulic cylinder 98 is mounted to a stationary support 99 fixed at the left end of the machine and has a piston rod 101 having an end thereof fixed to the cross member 93 so that actuation of the cylinder 98 causes longitudinal movement of the traverse assembly 39 along guide rods 96 and 97. Another air or hydraulic cylinder 102 is mounted to a stationary support 103 at the other end of the machine. Cylinder 102 has a piston rod 104 which has a precision ground flanged head 105.

When piston rod 101 is retracted, the traverse assembly 39 is at its left-most position, hereinafter called the starting position. When cylinder 98 is actuated, the traverse assembly 39 moves longitudinally along the guide rods 96 and 97 until a pair of precision ground stops 106, fixed to the cross member 93, abuts against a pair of precision ground stops 107, which are fixed to the support 103. This stops the traverse assembly 39 at a position hereinafter called the printing or fabricating position. It is apparent that the length of sheet material 21 that can be advanced by one stroke of the traversing assembly 39 is equal to the length of the stroke of the piston rod 101. However, since it may be desirable to advance shorter lengths of sheet material 21 at one time, the second cylinder 102 is utilized to stop the traverse assembly 39 at a position intermediate the starting position and the printing position. This intermediate position is hereinafter called the pickup position. To stop the traverse assembly 39 at the pickup position, cylinder 102 is actuated to move the head 105 of the piston rod 104 against another precision ground stop 108 mounted to the cross member 93. The force of the cylinder 102 is sufficient to overcome further longitudinal movement of the traverse assembly 39. Thus the length of sheet material 21 which can be advanced by one cycle of the traverse assembly 39 can be adjusted by merely varying the stroke of the piston rod 104 of cylinder 102. After the pickup is accomplished at this position, that is the collet fingers have moved into and expanded within the guide holes 78 and 92 as previously described, then the pressure on cylinder 102 is released permitting cylinder 98 and piston rod 101 to move the traverse assembly 39 to the printing station, thus advancing the sheet material 21.

Figure 8:
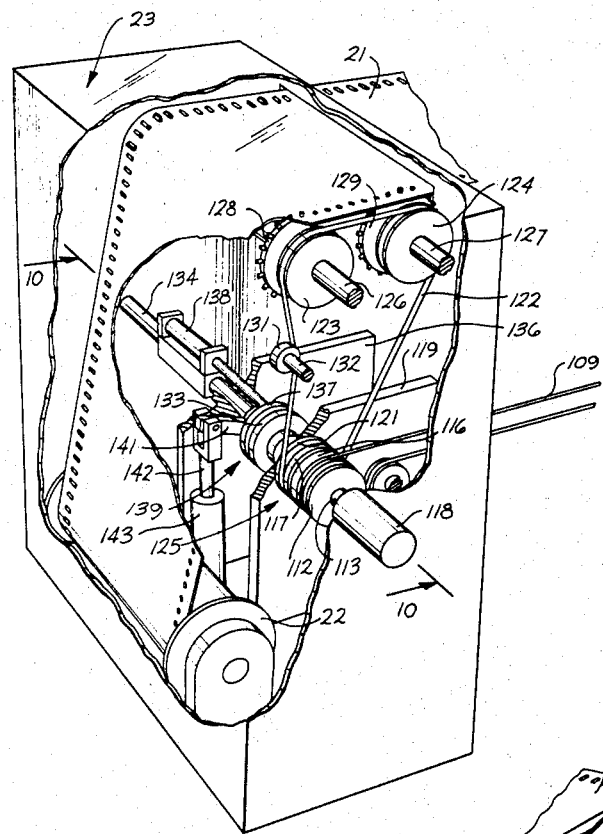
FIG. 8 is a cutaway perspective view of the supply station shown in FIG. 1 showing the apparatus which supplies the sheet material and provides and removes slack therefrom.
Figure 9:
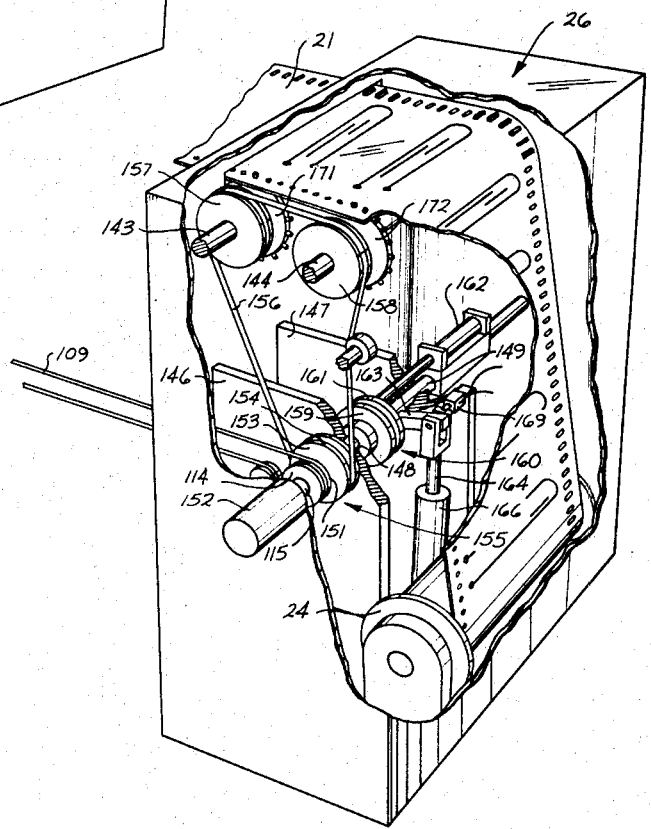
FIG. 9 is a cutaway perspective view of the take-up station shown in FIG. 1 showing the apparatus which takes up the sheet material and provides and removes slack therefrom.
Figure 10:
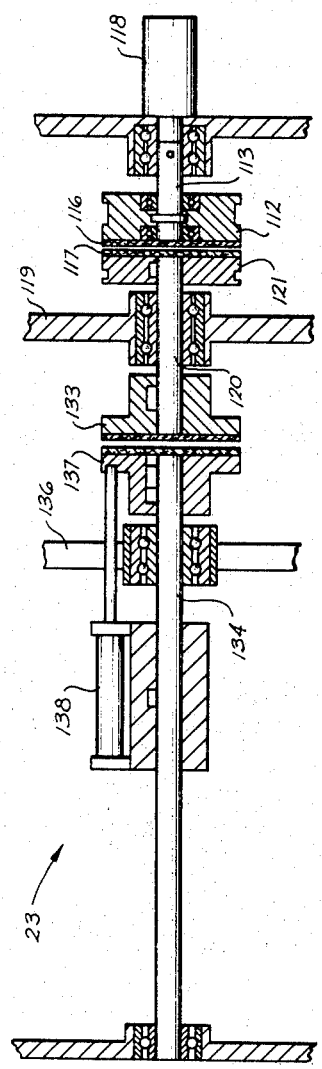
FIG. 10 is a cross-sectional view taken along line 10—10 of FIG. 8 showing in detail the mechanism which provides and removes slack from the sheet material.

A cable 109 is fixed to the bottom of standard 37 by set screw 111 and is therefore movable with the standard 37. The cable 109 forms a closed loop, one end of which passes over a cable pulley 112 which is rotatably mounted on a shaft 113 at the supply station 23, as shown in FIGS. 8 and 10. The other end of the cable 109 passes over a cable pulley 114 which is rotatably mounted on a shaft 115 at the take-up station 26, as shown in FIG. 9. The cable pulley 112 has a pressure plate or clutch face 116 fixed thereto which engages with a clutch body 117, upon actuation of an air cylinder 118, which is connected to the shaft 113, to impart axial movement thereto. Clutch body 117 is fixed to a shaft 120 which is supported in axial alignment with the shaft 113 by a bearing mounted in a support member 119. The clutch face 116 and clutch body 117 is hereinafter referred to as the drive clutch 125. A belt pulley 121 is fixed to the shaft 120 in juxtaposition to the clutch body 117. A plastic belt 122 passes over the belt pulley 121 and also passes over belt pulleys 123 and 124 which are fixedly mounted on shafts 126 and 127, respectively. A pair of sprockets 128 and 129 are fixed to the shafts 126 and 127, respectively, adjacent the belt pulleys. An idler pulley 131 mounted on a shaft 132 is movable into engagement with the belt 122 to impart tension thereto.

Another clutch body 133 is fixed to the other end of shaft 120. Another shaft 134 is mounted in axial alignment with shaft 120, and is supported by the side plate of the supply station housing and support member 136. A clutch face 137 is fixed to the end of the shaft 120 facing the clutch body 133. The clutch face 137 is movable into engagement with the clutch body 133 by air cylinder 138 which is rotatably mounted on and parallel to the shaft 134. The clutch body 133 and clutch face 137 will hereinafter be referred to as the slack-taut clutch 139. A link 141 has one end secured to the clutch face 137 and the other end pivotally connected to a piston rod 142 of another air cylinder 143.

Cylinder 118 is actuated at certain times during an operational cycle of the machine to engage the drive clutch 125 so that movement of the cable 109 causes similar movement of the sprockets 128 and 129. Cylinder 138 is actuated at certain different times during the sequence of operation of the machine to engage the slack-taut clutch 139 so that actuation of cylinder 143 rotates the slack-taut clutch 139 and consequently rotates the sprockets 128 and 129 either clockwise, to provide slack in the sheet material 21, or counterclockwise, to remove slack from the sheet material and make it taut. It is to be noted that clutches 125 and 139 are never engaged simultaneously.

Referring now to FIG. 9, there is shown the take-up mechanism at the take-up station 26 which is similar to the previously described mechanism shown at the supply station 23 (FIG. 8). The side plates of the take-up station housing support shafts 143 and 144 as well as shaft 115. A pair of support members 146 and 147 support a pair of axially aligned shafts 148 and 149, respectively. A clutch face 151 is fixed to the cable pulley 114 on shaft 115. An air cylinder 152 is connected to shaft 115 to impart axial movement thereto to move the clutch face 151 into engagement with a clutch body 153 which is fixed to the end of shaft 148. The clutch face 151 and clutch body 153 is hereinafter referred to as drive clutch 155. A belt pulley 154, mounted on shaft 148, is connected to the clutch body 153, and supports a plastic belt 156 which also moves around belt pulleys 157 and 158 mounted on shafts 143 and 144, respectively. The other end of shaft 148 has a clutch body 159 fixed thereto. Shaft 149 has a clutch face 161 on one end thereof which is movable into engagement with the clutch body 159 by an air cylinder 162. The clutch body 159 and clutch face 161 is hereinafter referred to as slack-taut clutch 160.

A link 163 has one end thereof secured to the clutch face 161. The other end of link 163 is pivotally connected to a piston rod 164 of an air cylinder 166. When the drive clutch 155 is engaged, movement of the cable 109 causes rotation of sprockets 171 and 172. When slack-taut clutch 160 is engaged, the air cylinder 166 can be actuated to rotate the clutch either counterclockwise, to provide slack in the sheet material 21, or clockwise, to remove slack from the sheet material 21 and make it taut.

It is to be noted that the actuating force of cylinders 138 and 162 causing engagment of the slack-taut clutches 139 and 160 respectively, is adjustable so that the respective clutches slip when a predetermined tension is imparted to the sheet material 21. This is particularly important in order to prevent stretching or breaking of the sheet material 21 when the clutches are engaged and rotated to remove slack from the sheet material to make it taut.

OPERATION

Figure 11:
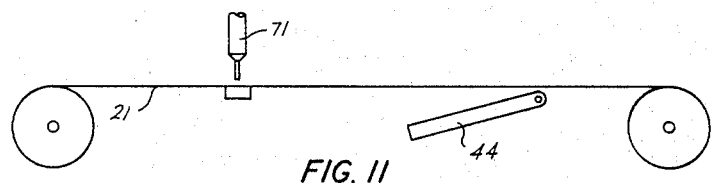
FIGS. 11–17 are diagrammatic views illustrating the sequences followed in the advancement of the sheet material.
Figure 12:
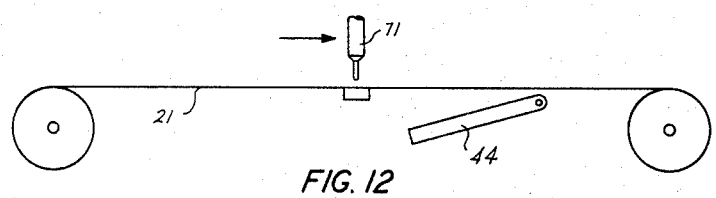

At the beginning of a cycle of operation, the traverse assembly 39 and collet assemblies 32 and 33 are at the left end of the machine in the starting position as shown diagrammatically in FIG. 11. At this time, the sheet material 21 is held taut and drive clutches 125 and 155 are disengaged. Then cylinder 98 is actutated to advance the traversing assembly 39, and cylinder 102 is simultaneously actuated to stop the traversing assembly 39 at the pickup position as illustrated in FIG. 12.

Figure 13:
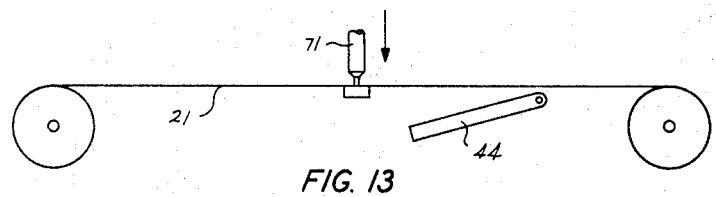
Figure 14:
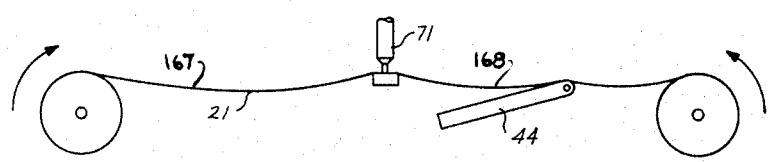

For the purpose of illustration, the operation of the machine is hereinafter described with reference to only the right collet assembly 32. It is to be understood that the left collet assembly 33 functions the same as and simultaneously with the right collet assembly 32. Valve 68 is now actuated to connect the low pressure source 69 to the air cylinder 63 to move the cage 57 of the collet assembly 32 downwardly so that the constricted fingers 81 enter a guide hole 78 in the taut sheet material 21 as shown in FIG. 13. When the top plate 59 of the cage 57 engages microswitch 88, the air cylinders 138 and 162 are actuated to engage the slack-taut clutches 139 and 160, respectively. Immediately thereafter, air cylinder 143 is actuated to extend piston rod 142 which imparts a predetermined amount of clockwise rotation to the slack-taut clutch 139 to provide a slack portion 167 in the sheet material 21 as shown in FIG. 14. Air cylinder 166 is actuated simultaneously with air cylinder 143 to extend the piston rod 164 to impart a predetermined amount of counterclockwise rotation to the slack-taut clutch 160 to provide a slack portion 168, also shown in FIG. 14.

In its extended position, the end of piston rod 164 closes a switch 169 which is mounted on the support member 147. This occurs after slack portions 167 and 168 are formed. The closure of switch 169 causes the valve 68 to connect the air cylinder 63 to high pressure source 70 thus moving the cage 57 downwardly against the force of spring 86. Accordingly, the collet seat 83 moves away from the taper 77 of collet 71 permitting the constricted fingers 81 to expand within the guide hole 78 to shift and position the sheet material 21 accurately with respect to the collets.

Figure 15:
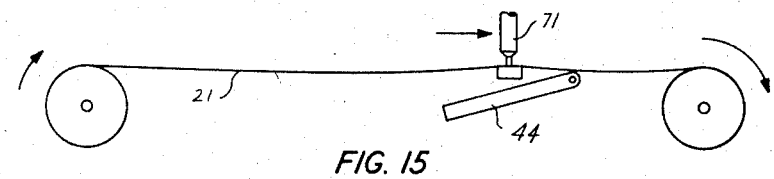

Air cylinders 138 and 162 are then actuated to disengage slack-taut clutches 139 and 160, respectively, while air cylinders 118 and 152 are actuated to engage the drive clutches 125 and 155. Thereafter, pressure in air cylinder 102 is released permitting air cylinder 98 and piston rod 101 to advance the traverse assembly 39 so that the sheet material 21, which is effectively gripped by the fingers 81 ad 89 within the guide holes 78 and 92, is moved to the printing position as shown in FIG. 15.

During the advancement of the sheet material 21 from the pickup position to the printing position, the slack portion 168 ordinarily increases due to the forward movement of the traverse assembly 39 while the slack portion 167 decreases. In order to take up as much of the slack portion 168 as possible, the take-up sprockets 171 and 172 are rotated through a larger angle than the supply sprockets 128 and 129. This is accomplished by using cable pulleys of different diameters, that is, the take-up cable pulley 114 has a smaller diameter than the supply cable pulley 112. Thus, the longitudinal movement of cable 109 causes pulley 114 to rotate through a larger angle of rotation than pulley 112 so that a longer portion of the sheet material 21 is wound onto the take-up drum 23 than is supplied from the supply drum 22. Thus slack portions 167 and 168 are both decreased during advancement of the traverse assembly 39 from the pickup position to the printing position. It is to be noted that the sheet material 21 is advanced primarily due to the movement of the traverse assembly 39 and collet assemblies 32 and 33. The sprockets 128, 129, and 171, 172 help to support the sheet material 21 during its advancement thereof, and also aid in reducing the slack.

Figure 16:
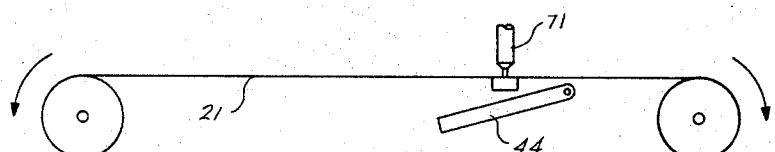
Figure 17:
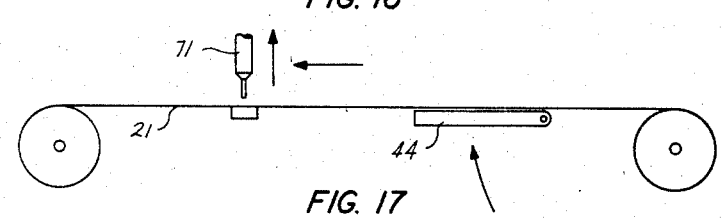

When the material 21 is advanced to the printing position, air cylinders 118 and 152 are actuated to disengage the drive clutches 125 and 155. Simultaneously therewith, air cylinders 138 and 162 are actuated to engage the slack-taut clutches 139 and 160, respectively, so that when air cylinders 143 and 166 are actuated to pull the piston rods 142 and 164 downwardly, the sheet material 21 can be made taut as shown in FIG. 16. As previously stated, the forces applied to the slack-taut clutches 139 and 160 can be adjusted so that the clutches slip when a predetermined tension is imparted to the sheet material 21. This insures that the sheet material 21 is made taut prior to printing, but that excessive tension is not applied thereto.

After the sheet material 21 is made taut, vacuum is applied to stationary vacuum table 43 to hold the sheet material 21 thereagainst. Air cylinder 63 is then actuated, in response to the vacuum being applied to stationary vacuum table 43, to move the cage 57 upwardly and thus move the finger 81 out of the guide hole 78. Then the traversing assembly 39 is moved back to the starting position. At this point, pivotally mounted vacuum tables 44 and 45 swing upwardly and a vacuum is applied thereto so that the entire width of the sheet material 21 is secured at the printing station. The printing head 41 then moves downwardly to perform the requisite printing operation.

Figure 18:
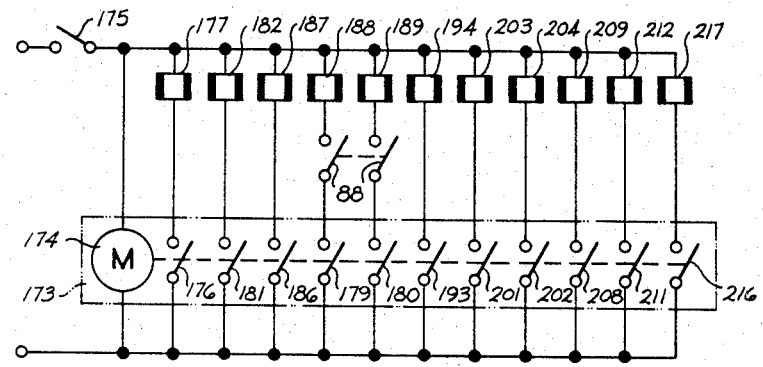
FIG. 18 is an electrical control circuit for the machine.
Figure 19:
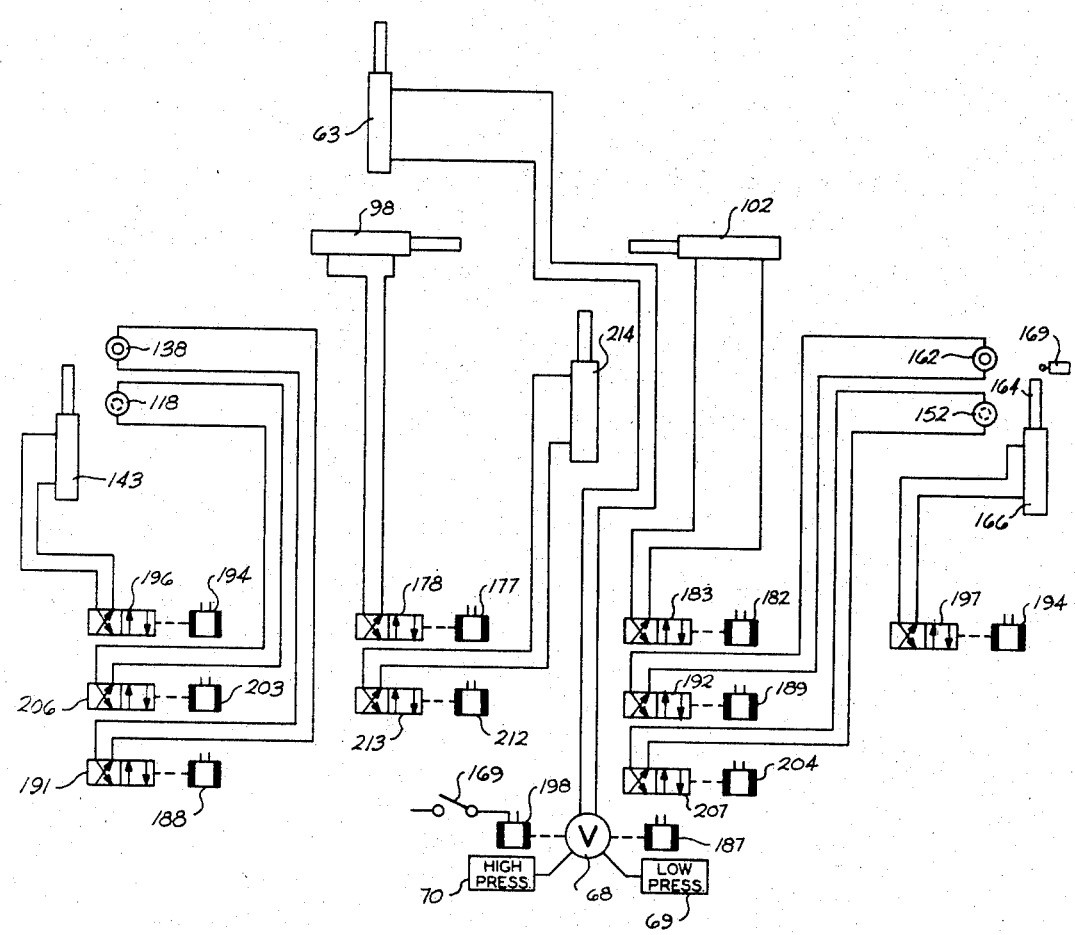
FIG. 19 is a diagrammatic view showing the pneumatic control system.

For the sake of clarity, the operation has previously been described without reference to the control system. Referring now to FIGS. 18 and 19, a control circuit and control system are shown, including a timing mechanism 173 provided with a motor 174 for operating a camming system (not shown), wherein a plurality of contacts of the timing mechanism are cam controlled to energize a corresponding plurality of solenoids to control the pneumatic operation of the apparatus. At the start of a cycle of operation, the traverse assembly 39 is at the left of the machine in the start position, and all of the cylinders are at a rest position. A switch 175 is then closed to start the motor 174 which results in a cam closing a contact 176 which energizes a solenoid 177 to open a valve 178 which supplies air pressure to the air cylinder 98 to advance the traverse assembly 39. Simultaneously, a contact 181 is closed by a cam to energize a solenoid 182 which opens a valve 183 to actuate the cylinder 102 to stop the traverse assembly 39 at the pickup position. At this point, a contact 186 is cammed closed to energize a solenoid 187 which actuates the valve 68 to connect cylinder 63 to the low pressure source 69 and move the cage 57 downwardly. When the top plate 59 of the cage 57 moves downwardly and closes the microswitch 88, solenoids 188 and 189 are energized and close air valves 191 and 192 to actuate the cylinders 138 and 162, respectively, to cause engagement of the slack-taut clutches 139 and 160.

Further rotation of the motor 174 closes the contact 193 which energizes the solenoid 194 to close a pair of valves 196 and 197 to actuate cylinders 143 and 166, respectively, to provide slack in the sheet material 21 as previously described. The piston rod 164 of cylinder 166, when fully extended, closes a switch 169 which energizes a solenoid 198 and causes valve 68 to connect to the high pressure source 71 to further move the cylinder 63 so that the collets enter the guide holes in the sheet material and expand therein.

At this point, the camming system opens contacts 179 and 180 to deenergize solenoids 188 and 189, causing retraction of cylinders 138 and 162, respectively, thus disengaging the slack-taut clutches 139 and 160. Simultaneously therewith, contacts 201 and 202 are closed to energize solenoids 203 and 204 to open valves 206 and 207 to actuate cylinders 118 and 152 to engage the drive clutches 125 and 155. Immediately thereafter the camming system opens contact 181 to deenergize solenoid 182 causing retraction of cylinder 102 thus permitting the traverse assembly 39 to advance to the printing position.

When the traverse assembly 39 is advanced to the printing position, the camming system opens contacts 201 and 202 to disengage the drive clutches 125 and 155. Simultaneously therewith, contacts 179 and 180 are cammed closed to energize solenoids 188 and 189 to actuate the air cylinders 138 and 162 to engage the slack-taut clutches 139 and 160, respectively. Immediately thereafter, the camming system opens contact 193 to deenergize solenoid 194 causing retraction of cylinders 143 and 166 to remove the slack from sheet material 21. At this point, the camming system closes a contact 208 to energize solenoid 209 to operate a valve (not shown) to connect the stationary vacuum table 43 to a vacuum source. Immediately thereafter, solenoid 187 is deenergized cutting off the air pressure to cylinder 63 so that the cages 57 move upwardly. Then the camming system opens contact 176 deenergizing the solenoid 177 to retract cylinder 98 to move the traverse assembly 39 back to the starting position.

At this point, contact 211 is closed to energize a solenoid 212 which closes a valve 213 to actuate a cylinder 214 to move the pivotally mounted vacuum tables 44 and 45 upwardly so that a vacuum applied thereto holds the sheet material. Then contact 216 is cammed closed energizing solenoid 217 which moves the printing head 41 downwardly to perform the printing operation and complete the cycle.

It is to be understood that the subject invention can be practiced not only to perform a printing operation on the sheet material but also to perform other fabricating operations such as punching, blanking, cutting, and the like. It is to be further understood that the above apparatus and methods are merely illustrative of an application of the principles of the invention, and many other modifications may be made without departing from the spirit and scope of the invention.

What is claimed is:

1. Apparatus for accurately advancing and positioning sheet material having guide holes therein at a fabricating station comprising:
   an expandable member;
   means for moving said member downwardly into a guide hole;
   means for providing slack in said sheet material after said member is located within said guide hole;
   means for expanding said member within said guide hole to position and grip said sheet material; and
   means for advancing said member and said gripped sheet material to a fabricating station.

2. Apparatus for advancing sheet material having guide holes therein from a supply station to a take-up station comprising:
   an expandable collet member;
   means for moving said collet member into a guide hole in said sheet material;
   means responsive to the entry of said collet member in said guide hole for providing slack in said sheet material between said supply station and said take-up station;
   means for expanding said collet member within said guide hole to position and grip said sheet material; and
   means for advancing said collet member and said gripped sheet material to said take-up station.

3. Apparatus for advancing sheet material having guide holes therein from a supply station to a take-up station comprising:
   a collet member having a segmented end forming a plurality of resilient fingers;
   means for constricting said fingers;
   means for moving said constricted fingers into a guide hole in said sheet material;
   means responsive to the entry of said constricted fingers into said guide hole for providing slack in said sheet material between said supply station and said take-up station;
   means for disengaging said constricting means to expand said fingers in said guide hole; and
   means for advancing said collet member to carry said slackened material toward said take-up station.

4. Apparatus for advancing sheet material having guide holes therein from a supply station to a fabricating station and for positioning said sheet material with respect to a fabricating tool located at the fabricating station comprising:
   a collet member having a plurality of resilient fingers at one end thereof;
   means for constricting said fingers;
   means for moving said constricted fingers downwardly into a guide hole in said material;
   means actuated in response to the downward movement of said moving means for slackening said sheet material after said fingers enter said guide hole;
   means responsive to the slackening of said material for disengaging said constricting means to expand said fingers within said guide hole; and
   means for advancing said collet member and sheet material toward said fabricating station.

5. Apparatus for positioning sheet material having guide holes therein with respect to a fabricating tool comprising:
   an expandable collet member;
   means for moving said collet member into a guide hole in said material;
   means responsive to the moving of said collet member into said guide hole for providing slack in said sheet material; and
   means for expanding said collet member after slack is provided to position the sheet material with respect to the fabricating tool.

6. Apparatus for positioning sheet material having guide holes therein with respect to a fabricating tool comprising:
   a collet member having a segmented end forming a plurality of resilient fingers;
   a cage having bottom and top plates connected by side supports, said bottom plate having a conically shaped opening therethrough for receiving and constricting said resilient fingers, said top plate having an opening therethrough for slidably receiving the other end of said collet member;
   means for urging said resilient fingers of said collet member into said conically shaped opening to maintain said resilient fingers constricted;
   means for moving said cage downwardly so that said constricted fingers enter a guide hole in said sheet material;
   means rendered effective after said constricted fingers enter said guide hole for providing slack in said sheet material; and
   means rendered effective after slack is provided in said sheet material for moving said cage relative to said collet member to expand said fingers within said guide hole.

7. A method of advancing sheet material from a supply station to a take-up station comprising:
   gripping said material intermediate said station;
   providing slack in said sheet material;
   advancing said gripped and slackened material toward said take-up station; and
   removing the slack from said sheet material after advancement thereof.

8. A method of advancing a sheet of material from a supply roll to a take-up roll comprising:
   gripping said material intermediate said rolls;
   rotating said supply roll and said take-up roll in opposite directions toward each other to form a first slack section between the gripped material and the supply roll and a second slack section between the gripped material and the take-up roll;
   advancing said gripped material toward said take-up roll while simultaneously:
      (a) rotating said take-up roll in the direction of advancement through a first predetermined angle to take up some of the second slack section; and
      (b) rotating said supply roll in the direction of advancement through a second predetermined angle smaller than said first predetermined angle to take up some of the first slack section.

9. A method of using an expandable member to advance sheet material having guide holes therein from a supply station to a take-up station comprising:
   moving the expandable member into a guide hole in said sheet material;
   providing slack in the sheet material between the supply station and the take-up station;
   expanding the member within said guide hole to position and grip the material; and
   advancing the member to carry said gripped material toward said take-up station.

10. The method of using an expandable collet to advance sheet material having guide holes therein from a supply roll to a take-up roll comprising:
   moving the expandable collet into a guide hole;
   rotating said supply roll and said take-up roll in opposite directions toward each other to provide a slack section of material between said rolls;
   expanding the collet within the said guide hole to position and grip the material;
   advancing said gripped material toward said take-up roll; and
   simultaneously rotating said take-up roll a first predetermined angle in the direction of advancement to take up slack between the collet and the take-up roll and rotating said supply roll a second predetermined angle smaller than said first predetermined angle in the direction of advancement to take up slack between the supply roll and the collet.

References Cited

UNITED STATES PATENTS 2,806,691   9/1957   Kalin _____ 226—87

M. HENSON WOOD, Jr., *Primary Examiner.*

J. P. MULLINS, *Assistant Examiner.*